United States Patent van der Lely et al.

[15] 3,667,551

[45] June 6, 1972

[54] CULTIVATING IMPLEMENTS

[72] Inventors: Cornelis van der Lely, 7 Bruschenrain, Zug, Switzerland; Ary van der Lely, 10 Weverskade, Maasland, Netherlands

[22] Filed: July 8, 1970

[21] Appl. No.: 56,164

Related U.S. Application Data

[63] Continuation of Ser. No. 727,109, May 6, 1968, abandoned.

[30] Foreign Application Priority Data

May 12, 1967  Netherlands..........................67/06637

[52] U.S. Cl.................................172/59, 172/111, 172/125, 172/669, 172/762
[51] Int. Cl. .......................................................A01b 33/00
[58] Field of Search....................172/59, 111, 125, 657, 119, 172/762

[56] References Cited

UNITED STATES PATENTS

| | | | |
|---|---|---|---|
| 3,108,645 | 10/1963 | Hill | 172/59 X |
| 3,233,685 | 2/1966 | Brewer | 172/119 |
| 1,905,016 | 4/1933 | Traphagen | 172/762 |
| 2,753,674 | 7/1956 | Cunningham et al. | 56/6 |
| 3,138,208 | 6/1964 | Simms | 172/111 |
| 3,433,118 | 3/1969 | Ward | 85/8.3 |

*Primary Examiner*—Robert E. Pulfrey
*Assistant Examiner*—R. T. Rader
*Attorney*—Mason, Mason & Albright

[57] ABSTRACT

An agricultural machine with implements that are powered by rotary shaft, the connections between the implements and the shafts include quick releases so that various implements, including spreaders, tined members and other working implements, can be interchanged.

5 Claims, 20 Drawing Figures

Fig.1

PATENTED JUN 6 1972 3,667,551

INVENTORS
CORNELIS VAN DER LELY
ARY VAN DER LELY

Mason, Mason & Albright
Attorneys

INVENTORS
CORNELIS VAN DER LELY
ARY VAN DER LELY

Mason, Mason & Albright
Attorneys

INVENTORS
CORNELIS VAN DER LELY
ARY VAN DER LELY

Mason, Mason & Albright
Attorneys

CULTIVATING IMPLEMENTS

This application is a continuation of Ser. No. 727,109, filed May 6, 1968, now abandoned.

This invention relates to cultivating implements or cultivators of the kind comprising a movable frame and a plurality of soil-working members or other working members that are rotatable about non-horizontal axes.

An object of the invention is the provision of a cultivating implement or cultivator of considerable versatility as regards the nature of the operations which it can perform.

According to the invention, there is provided a cultivating implement or cultivator of the kind set forth, wherein quickly-releasable connections are provided by which various working members intended for different operations can be coupled with rotary driving shafts therefor.

For a better understanding of the invention, and to show how the same may be carried into effect, reference will now be made, by way of example, to the accompanying drawings, in which:

Figure 1:
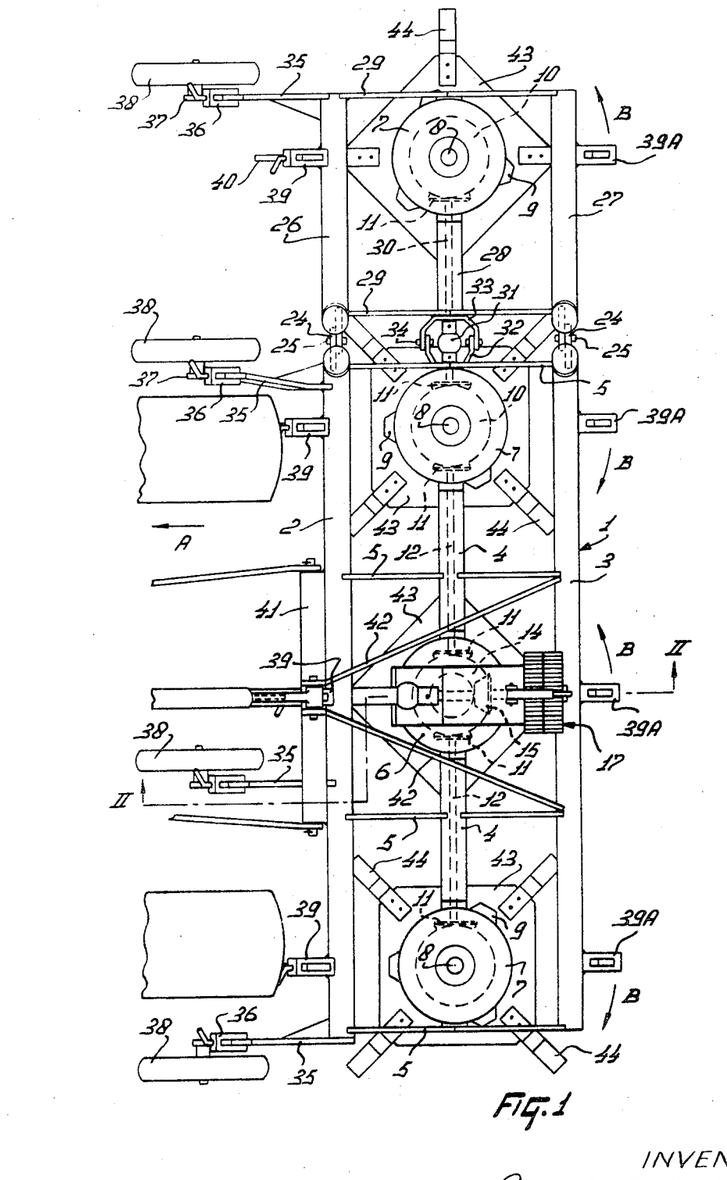
FIG. 1 is a plan view of a cultivating implement or cultivator in accordance with the invention mounted at the rear of a tractor.
Figure 2:
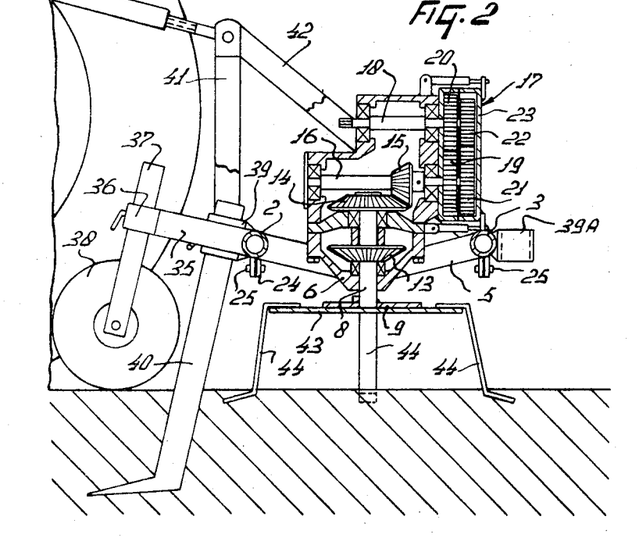
FIG. 2 is a section taken on the line II—II of FIG. 1.

Referring to FIGS. 1 and 2 of the drawings, the soil cultivating implement or cultivator which is illustrated has a frame 1 which includes two substantially horizontal frame beams 2 and 3 that extend generally perpendicular to the intended direction of operative travel of the cultivator which is indicated by an arrow A in FIG. 1 of the drawings. A tubular frame beam 4 extends parallel to the beams 2 and 3 at a location midway between the latter beams and at a lower level than those beams (see FIG. 3). The beam 4 is connected to the two beams 2 and 3 by strips 5 located at the opposite ends of the beams and at locations spaced from said ends towards the mid-points of the beams. A gear box 6 is arranged at the mid-point of the beam 4 and two further gear boxes 7 are arranged at opposite ends of said beam. Each of the gear boxes 6 and 7 accommodates a corresponding substantially vertical rotary shaft 8 the lowermost end of which carries a triangular support plate 9. Holes (not visible in FIGS. 1 and 2 of the drawings) are provided in the support plates 9 adjacent the corners of those plates. An upper region of each of the shafts 8 that is located internally of one of the gear boxes 7 carries a bevel pinion 10 whose teeth are in mesh with those of a further bevel pinion 11 mounted at one end of one of two substantially horizontal rotary shafts 12 that extend between the gear box 6 and the two gear boxes 7 internally of the corresponding portions of the tubular frame beam 4. The ends of the two shafts 12 that are located internally of the gear box 6 carry further bevel pinions 11 whose teeth are in mesh with those of a bevel pinion 13 carried by the portion of the corresponding shaft 8 that is located internally of the gear box 6.

It can be seen from FIG. 2 of the drawings that the portion of the shaft 8 which is located internally of the gear box 6 carries a second bevel pinion 14 the teeth of which are in mesh with those of a pinion 15 mounted on a substantially horizontal rotary shaft 16 that extends more or less parallel to the direction A. The rearmost end of the shaft 16 is in driven connection, by way of a change-speed gear 17, with a rotary shaft 18 that also extends generally parallel to the direction A and the leading end of which that projects from the gear box 6 is splined or otherwise keyed to enable it to be placed in driven connection with the power take-off shaft of an agricultural tractor or other vehicle by way of an intermediate telescopic transmission shaft having universal joints at its opposite ends. The shaft 18 is located above the shaft 16 and one end of the telescopic transmission shaft which has just been mentioned is illustrated somewhat diagrammatically in FIG. 1 of the drawings.

The change-speed gear 17 (FIG. 2) takes the form of a housing 23 containing two co-operating pairs of pinions 19, 20 and 21, 22 respectively. The pinions 19 to 22 are of different diameters and the arrangement of the change-speed gear 17 is such that its housing 23 can be mounted in any one of four different positions relative to the gear box 6, each such position giving a corresponding transmission ratio between the shaft 18 and the shaft 16. The change-speed gear 17 can be mounted in any one of its four operative positions with the aid of a quickly releasable clamp and it will be understood that, in each position, only one of the two pairs of pinions 19, 20 or 21, 22 is functional. The other pair remains inoperative. The three alternative positions that are possible can be reached from the position shown in FIG. 2 by inverting the housing 23, reversing the housing 23 as regards its foremost and rearmost sides or by both inverting and reversing said housing.

Lugs 24 are provided at the right-hand ends of the frame beams 2 and 3 when the cultivator is viewed in the direction A and these lugs 24 are pivotally connected by horizontally aligned pins 25 to further lugs 24 carried by beams 26 and 27 that are in approximate axial alignment with the beams 2 and 3 respectively during operation of the cultivator. The neighboring ends of the beams 2, 3, 26 and 27 are bevelled as can be seen in FIG. 1 of the drawings to enable said beams 26 and 27 to be tilted upwardly about the axis afforded by the pins 25 to bring the cultivator to an inoperative transport position of reduced width in which said bevelled ends will abut against one another. The beams 26 and 27 are preferably turned through more than 90° about the axis of the pins 25 to bring them to the inoperative transport position and positive retaining means (not shown), such as a chain, may be provided if desired. The beams 26 and 27 have lengths equal to about one-third of the lengths of the beams 2 and 3 and a tubular frame beam 28 is arranged midway between them in parallel relationship and in approximate axial alignment with the beam 4 when the cultivator occupies its operative position. Strips 29, corresponding to the previously mentioned strips 5, rigidly connect the beam 28 to the beams 26 and 27. The beam 28 is provided with a further gear box 7 that is spaced apart from the neighboring gear box 7 carried by the beam 4 by a distance equal to the spacing between the gear box 6 and the two gear boxes 7 that are located on relatively opposite sides thereof. The gear box 7 that is associated with the beam 28 is provided with parts 8, 9, 10 and 11 that correspond in construction and function to the previously described parts that are denoted by the same reference numerals. The bevel pinion 11 in question is mounted at one end of a rotary shaft 30 that extends axially of the interior of the beam 28, the end of said shaft 30 that is remote from the gear box 7 in question being connected by a universal joint 31 to the facing end of a short shaft that carries a further bevel pinion 11 and that is in axial alignment with the aforementioned rotary shafts 12. It will be noted that the center of the universal joint 31 is coincident with the axis afforded by the aligned pins 25.

The neighboring ends of the two beams 4 and 28 are provided with forked brackets 32 and 33 respectively, the limbs of these brackets being pivotally interconnected by aligned pins 34 that are coaxial with the aligned pins 25 interconnecting the lugs 24. Four supports 35 project forwardly from the frame beams 2 and 26, there being a support 35 near the midpoint of the frame beam 2, two supports 35 at opposite ends of the frame beam 2 and one support 35 at the end of the beam 26 remote from the corresponding lug 24. The supports 35 extend approximately parallel to the direction A and their leading ends are provided with rectangular sleeves 36 in which approximately vertically extending legs 37 are upwardly and downwardly adjustable. The sleeves 36 are provided with locking pins to enable chosen settings of the legs 37 therethrough to be maintained. The lowermost ends of the legs 37 have corresponding ground wheels 38 rotatably connected to them.

Rectangular sleeves 39 are secured to the beams 2 and 26 at four locations that are disposed perpendicularly in front of the corresponding shafts 8 with respect to the direction A. Four similar rectangular sleeves 39A are secured to the two beams 3 and 27 at locations which are disposed perpendicularly behind the four shafts 8 with respect to the direction A. The sleeves 39 are primarily intended to receive sub-soil cultivators 40 of the kind that can be seen best in FIGS. 2 and 3 of the drawings, each sleeve 39 being provided with a locking pin to enable the corresponding sub-soil cultivator 40 to be retained in a corresponding depth setting. Each sub-soil cultivator 40 includes an upright strip-shaped portion which is entered through the corresponding rectangular sleeve 39, said portion being formed with holes that cooperate with the tip of the locking pin which is provided for that purpose. The sleeves 39A, on the other hand, are intended primarily for the connection of ridging mechanism to the frame 1 of the cultivating implement. The frame beam 2 is provided, in front of the gear box 6, with a more or less conventional coupling member 41 adapted to enable the frame 1 to be releasably connected to the three-point lifting device or hitch of an agricultural tractor or other vehicle in the manner which can be seen in outline in FIGS. 1 and 2 of the drawings. The apex of the generally triangular coupling member 41 is connected to the rear frame beam 3 by rearwardly divergent strips 42 that pass the gear box 6 at opposite sides of the latter.

Figure 4:
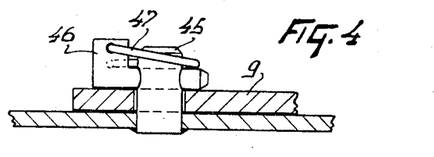
FIG. 4 is a scrap sectional elevation, to an enlarged scale, of a quickly releasable connection between two of the parts that can be seen in FIG. 3 of the drawings, FIG. 5 corresponds to FIG. 3 but shows a further alternative construction.

Each of the previously mentioned generally triangular support plates 9 that is formed with holes adjacent its corners forms part of a quickly releasable connection between the corresponding shaft 8 and one of a number of different forms of soil-working member. The soil-working member which is shown in FIGS. 1 and 2 of the drawings takes the form of a generally square support plate 43 having strip-shaped tines 44 mounted at its four corners. Each tine 44 is preferably formed from resilient material, such as spring steel, and has a portion which extends downwardly from the plate 43 and outwardly from said plate relative to the axis of the corresponding shaft 8, the lowermost end of the tine, which is intended to make working contact with the soil, being bent over so as to extend horizontally or at a small inclination to the horizontal. The plate 43 has upwardly projecting dowels 45 (FIG. 4) and it will be evident that these dowels are entered through the aforementioned holes in the triangular support plates 9 to effect the connection of the plate 43 to the plate 9. Retaining pins 46 located above the plate 9 are entered through transverse bores in the upper ends of the dowels 45 and resilient rings 47 carried by the pins 46 are placed in positions in which they embrace the upper ends of the dowels 45 thus preventing the pins 46 from being withdrawn from the bores in said dowels. The resilient rings 47 are of split construction with their ends entered in non-aligned bores formed in handles of the pins 46, this arrangement being such that the resiliency of each ring 47 tends to urge that ring into the position shown in FIG. 4 of the drawings or into an inoperative position in which each end of the split ring is turned through approximately 180° about its pivotal connection with the handle of the pin 46.

Figure 3:
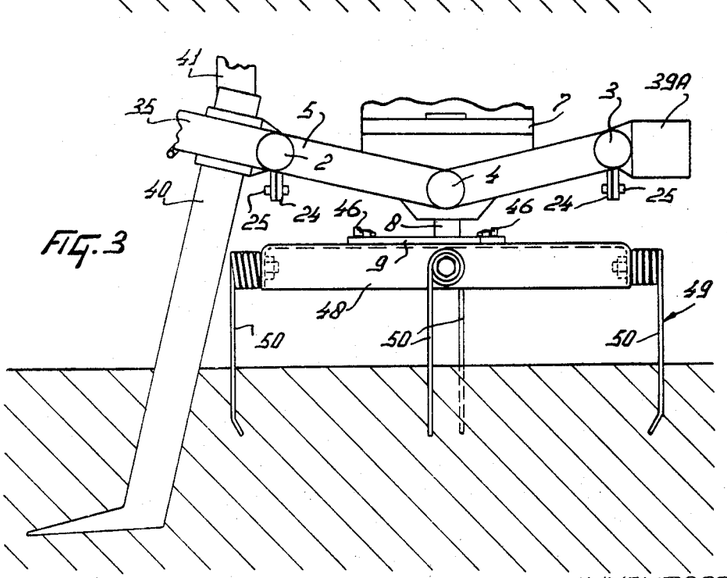
FIG. 3 is a side elevation, to an enlarged scale, showing an alternative construction of certain of the parts that can be seen in FIGS. 1 and 2 of the drawings.

FIG. 3 shows an alternative form of soil-working member having an inverted dish-shaped support plate 48 that is releasably connected to the corresponding plate 9 by the dowels 45 and retaining pins 46. The downwardly projecting rim of the circular plate 48 is provided at regular intervals with resilient spring steel tines 49 upper coiled portions of which are secured to said rim by corresponding bolts. Each tine 49 is of circular cross-section and has a downwardly projecting substantially vertical portion 50 that is consequently more or less parallel to the corresponding shaft 8. The lowermost ends of the tines 50 are bent over inwardly towards the axis of rotation of the corresponding shaft 8. The longitudinal axes of the coiled portions at the upper ends of the tines 49 extend generally radially of the corresponding shaft 8 and are therefore substantially horizontally disposed.

Figure 5:
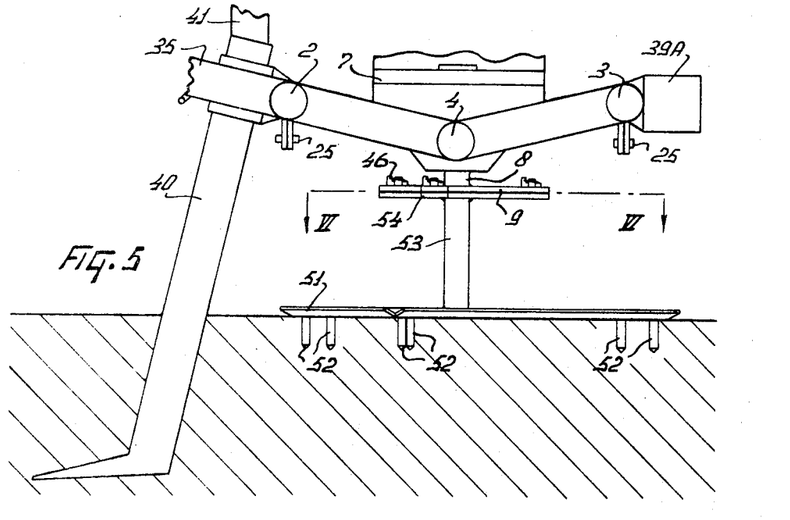
Figure 6:
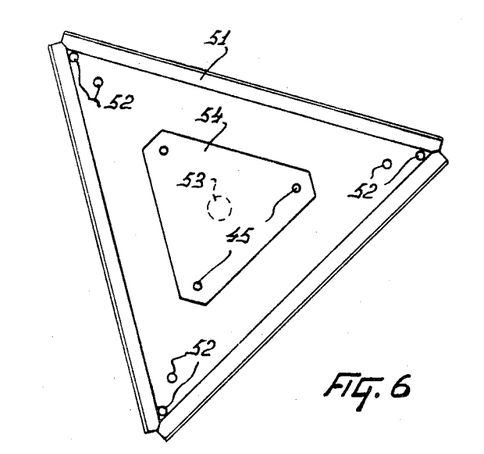
FIG. 6 is a view taken on the line VI—VI of FIG. 5.

The soil-working member shown in FIGS. 5 and 6 of the drawings is particularly suitable for employment in conjunction with the sub-soil cultivators 40, each such member comprising a triangular ground-engaging plate 51 the lowermost side of which carries six short spring steel tines 52 of circular cross-section, the tines 52 being arranged in three pairs at the corners of the triangular plate 51 with the two tines 52 of each pair on a line extending radially of the corresponding axis of rotation with one tine 52 closer to that axis than the other. The center of the upper surface of the plate 51 carries a vertical pillar 53 whose upper end carries a further substantially horizontally disposed triangular plate 54 having approximately the same dimensions as the triangular support plate 9. The upper surface of the plate 54 carries the projecting dowels 45 and can thus be connected to the support plate 9 in the manner which has previously been described.

Figure 7:
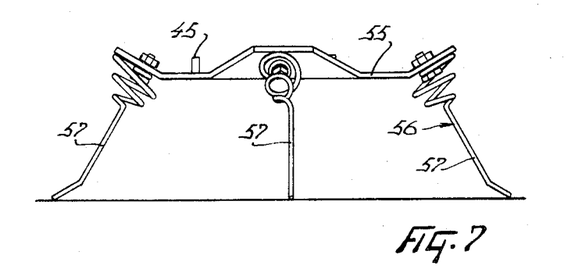
FIG. 7 is a side elevation, to a reduced scale, corresponding to FIGS. 3 and 5 but showing a further alternative construction, FIG. 8 corresponds to FIG. 7 but shows a still further alternative construction.

FIG. 7 shows a soil-working member that includes a generally square and substantially horizontally disposed support plate 55 the four corners of which are bent-over so as to project upwardly. Each of the four corners has a corresponding spring steel tine 56 secured to it by way of a bolt. Each tine 56 has a straight portion 57 that is inclined to the axis of rotation of the soil-working member in such a way as to diverge away from that axis towards the ground surface, the lowermost end of the tine being bent-over outwardly at a greater inclination than the remainder of the portion 57. The uppermost end of each portion 57 merges into the apex of a conical coil the base of which is secured to the corresponding corner of the plate 55 by one of the previously mentioned bolts. The plate 55 can be quickly connected to, and released from, one of the support plates 9 in the manner which has previously been described.

Figure 8:
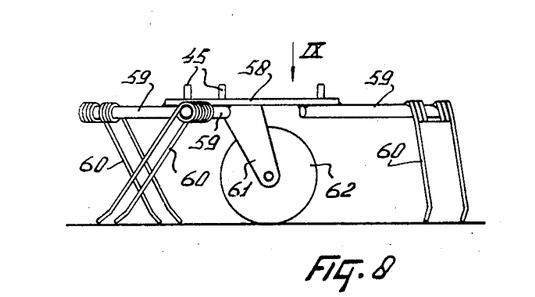
Figure 9:
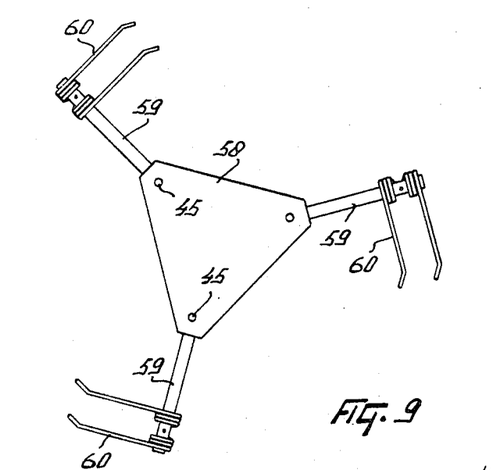
FIG. 9 is a view as seen in the direction indicated by the arrow IX of FIG. 8, FIGS. 10 and 11 show further alternative constructions.

FIGS. 8 and 9 of the drawings show a working member which includes a horizontally disposed flat triangular support plate 58 having three arms 59 secured to its lowermost surface so as to project radially outwardly from the three corners of the plate. Pairs of spring steel or other resilient tines 60 are fastened to the radially outermost ends of the arms 59, the tines 60 being inclined to the vertical in such a way that they trail relative to the intended direction of rotation of the plate 58 but being so disposed that, when the working member is viewed in plan (FIG. 9), each tine 60 extends substantially tangentially with respect to a circle whose center is coincident with that of the plate 58. The lowermost ends of the tines 60 are bent-over to a small extent with respect to the remainders thereof. A fork 61 is mounted centrally of the lower surface of the plate 58 in such a way as to be turnable about a substantially vertical axis relative to that plate. The limbs of the fork 61 support a horizontal axle about which a ground wheel 62 is rotatable. Once again, the plate 58 can be connected to one of the support plates 9 with the aid of the projecting dowels 45.

Figures 10, 11:
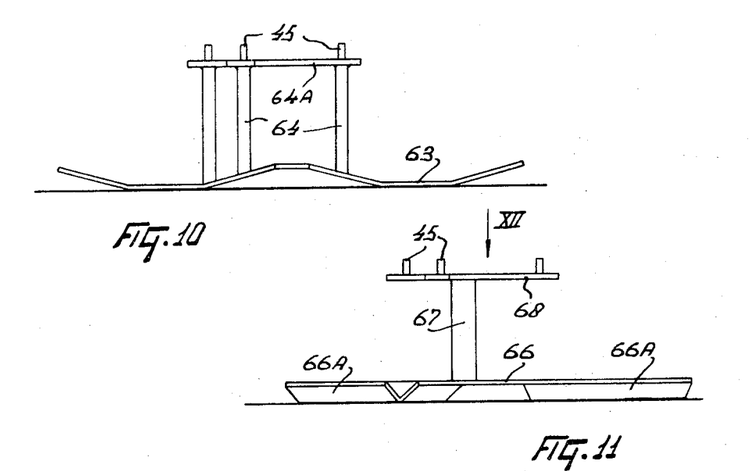

FIG. 10 shows a soil-working member which includes a square horizontally disposed plate 63 the four corners of which are bent-over upwardly. Three vertical pillars 64 project upwardly from the upper surface of the plate 63 and are interconnected at their upper ends by a support plate 64A, the three pillars 64 having dowel-like extensions which project through the support plate 64A to afford the dowels 45 which can be releasably secured to one of the support plates 9 in the manner that has previously been described.

Figure 12:
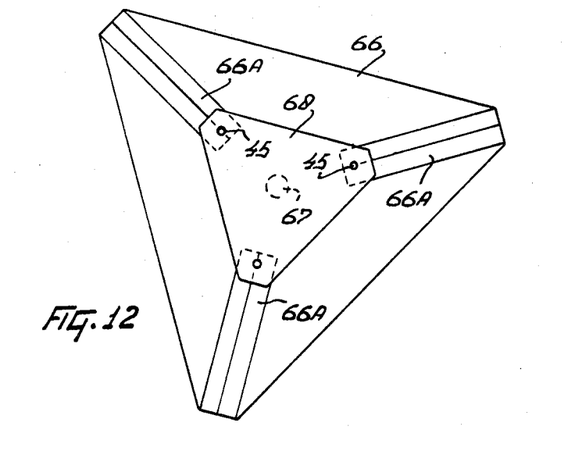
FIG. 12 is a view as seen in the direction indicated by the arrow XII of FIG. 11, FIG. 13 and 14 show further alternative construction.

FIGS. 11 and 12 of the drawings show a soil-working member which includes a generally triangular horizontally disposed plate 66 formed with three downwardly projecting soil-engaging ridges 66A that extend radially of the axis of rotation of the plate to its three corners. A vertical pillar 67 projects upwardly from the center of the plate and carries a triangular support late 68 at its uppermost end, the support plate 68 being provided with three projecting dowels 45 to enable it to be connected to one of the support plates 9 in the manner which has previously been described. In the soil-working member of FIG. 13 of the drawings, the triangular plate 66 is replaced by a circular dished plate 69 the concave side of which is disposed uppermost. The various plate-like soil-engaging parts such as 63, 66 or 69, may be formed from rolled metallic sheet material or, if preferred, they may be made from cast iron or other cast metal.

Figure 14:
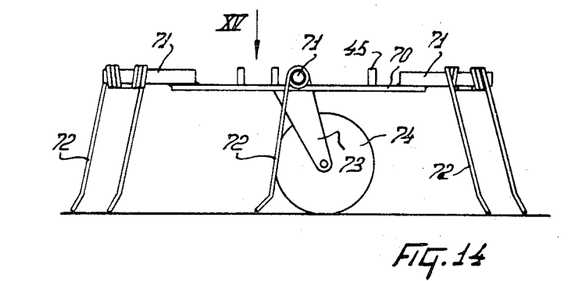
Figure 15:
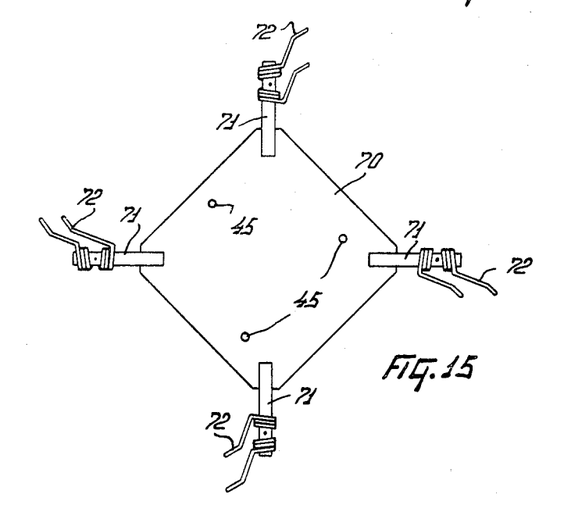
FIG. 15 is a view as seen in the direction indicated by the arrow XV of FIG. 14.

FIGS. 14 and 15 show a working member which may be employed in raking, turning or otherwise displacing cut grass or other crop lying on the ground. The working member has a square support plate 70 the four corners of the upper surface of which are provided with four short radially projecting arms 71. Each arm 71 has a corresponding pair of tines 72 secured to it adjacent its radially outermost end. The center of the lowermost surface of the plate 70 has a fork 73 connected to it so as to be turnable relative to said plate about a substantially vertical axis. The limbs of the fork 73 carry a horizontal axle about which a ground wheel 74 is rotatable between said limbs. Once again, the upper surface of the plate 70 is provided with projecting dowels 45 arranged for connection to one of the triangular support plates 9.

Figure 16:
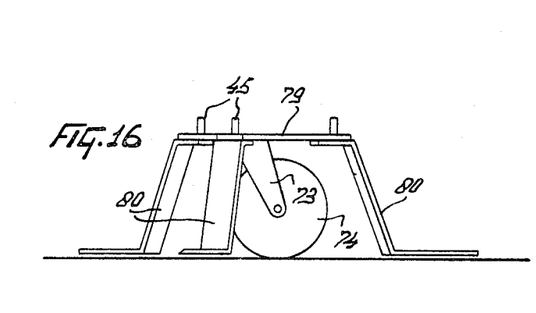
FIG. 16 is a side elevation of a still further alternative construction.

FIG. 16 illustrates a working member in the form of a triangular support plate 79 the three corners of which each carry a corresponding downwardly directed knife 80, the lowermost ends of the three knives 80 being bent over to lie substantially horizontally. The lower surface of the plate 79 is provided with a fork 73 and a ground wheel 74 arranged in the same manner as that which has been described in connection with FIGS. 14 and 15 of the drawings. The upper surface of the plate 79 is provided with dowels 45 for connection to one of the triangular support plates 9 and the whole working member may be employed in ground-clearing operations such as the cutting down of heavy weed infestations and the removal of scrub- and brush-like growth.

In the use of the cultivating implement or cultivator which has been described, its coupling member 41 is connected to the three-point lifting device or hitch or an agricultural tractor or other vehicle in the manner which can be seen in outline in FIGS. 1 and 2 of the drawings and the leading end of the rotary shaft 18 is placed in driven connection with the power take-off shaft of the same tractor or other vehicle in the manner which can be seen in outline in FIG. 1. The tractor or other vehicle moves the cultivator in the direction A, rotary drive from the shaft 18, which is located at substantially the same level as the power take-off shaft which has just been mentioned, being transmitted to the four shafts 8 by way of the change-speed gear 17, the gear box 6, the shafts 12 and 30 and the gear boxes 7. The bevel pinions in the various gear boxes are arranged in such a way that the four shafts 8 rotate in the directions indicated by the arrows B in FIG. 1 of the drawings, these directions being such that each shaft 8 rotates in an opposite direction to its neighbor or to both of its neighbors. The soil-working members or other working members that are connected to the lowermost ends of the shafts 8 can match undulations in the surface of the ground over which the cultivator is towed to a large extent due to the provision of the foregoing supporting elements that are afforded by the four vertically adjustable ground wheels 38, it being noted that there is one ground wheel 38 in respect of each of the four working members.

One of the working members, that is to say, the one supported by the beams 26, 27 and 28, is capable of matching undulations in the ground surface independently of the others by turning and downwardly about the substantially horizontal common axis of the pins 25, said axis extending more or less parallel to the direction A. It will be apparent that, although this has not been described, it would be possible to provide at least one further working member that can turn upwardly and downwardly relative to the others about an axis extending parallel to the common axis of the two pins 25. It is preferred that the perpendicular distances between neighboring shafts 8 should be between 60 and 90 centimeters and a distance of about 75 centimeters has been found to be the best for most purposes. The various working members shown in FIGS. 3 to 9 of the drawings have magnitudes such that, during their rotation, the tines of neighboring members move quite close to one another.

The different working members that have been described, together with the sub-soil cultivators 40, enable the cultivating implement to perform a large number of different operations since the sub-soil cultivators 40 can be omitted entirely or adjusted for working at various depths while the quickly releasable connections between the working members and the triangular support plates 9 enable one set of working members to be substituted for another in a very short period of time and without any difficulty. The soil-working members that have been described with reference to FIGS. 1 and 2 of the drawings may be employed in preparing previously ploughed land as a seed bed and it will therefore be appreciated that, generally speaking, the sub-soil cultivators 40 will not be required so that they may be temporarily removed from the cultivating implement before working commences. The tines 44 crumble lumps of soil and the top soil is thoroughly mixed so that a flat seed bed of quite fine consistency is obtained. When it is desirable that the soil should be tilled to a greater depth, for example in the cultivation of a stubble field, the soil-working members illustrated in FIG. 3 of the drawings may be employed. The depth of soil penetration is then such that the cultivating implement may be considered to operate as a rotary plough. The resilient tines 49 effect intensive tilling of the soil of the kind which is undertaken by a rotary plough and, having regard to the particular soil structure which is being dealt with, the sub-soil cultivators 40 may be either employed or omitted. When the parts 40 are employed, the sub-soil is broken up and aerated to a large extent without any appreciable quantity thereof being brought to the surface. The top soil, on the other hand, is worked intensively and deeply by the resilient tines 49.

When only shallow cultivation of the top soil is required, the working members shown in FIGS. 5 and 6 of the drawings may be employed, the tines 52 thereof having a length such that the soil is worked to a depth of approximately 5 centimeters. This minimizes the risk of deterioration of the top soil structure where only a shallow layer of top soil is present. In any case, shallow tilling of the soil may be all that is required in the case of certain seed crops. The soil-working member shown in FIG. 7 of the drawings may be used in a similar way to that which has been described in respect of the member shown in FIG. 3. The resilient tines 56 again cause the cultivating implement to act in the manner of a rotary plough and it will be realized that the same can be said of the action of the tines 44 and 52.

The working member illustrated in FIGS. 8 and 9 of the drawings is suitable for use in weeding operations, the wheel 62 serving to maintain the plate 58 at a more or less constant distance above ground level which is such that the tips of the tines 60 move through the uppermost layer of the dislodging the shallow roots of annual weeds.

Figure 13:
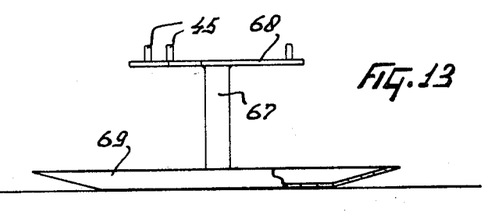

FIGS. 10 and 13 of the drawings show working members in which ridged or substantially smooth plates engage the soil. These plates effect a frictional action upon the soil surface and will thus level and crumble a lumpy or rough surface before the sowing of seed. The working member of FIGS. 14 and 15 of the drawings can be employed in raking, turning or otherwise displacing grass or other crop lying on the ground. It is preferred that, when the cultivating implement is provided with working members similar to the one illustrated in FIGS. 14 and 15, it should be connected to the three-point lifting device or hitch of the supporting and driving tractor or other vehicle in such a way as to be tilted forwardly to a small extent. The plate 70 will then be inclined to the horizontal by a few degrees so that the tips of the tines 72 will remain clear of contact with the ground during part of their rotation. As previously mentioned, the working member shown in FIG. 16 of the drawings may be employed in the cutting of weeds, crop and scrub- and brush-like growths.

The quickly releasable connections between the support plates 9 and the various working members that are intended for different purposes give the cultivating implement considerable versality as regards the nature of the operations which it can perform and it may accordingly be considered to be a "universal" cultivating implement or cultivator. The operating level of the various working members is adjusted by bringing the supporting elements that are afforded by the ground wheels 38 to appropriate settings and, as previously mentioned, the width of the cultivating implement can be reduced for transport and/or storages purposes. If desired, a simple form of reverse gear may be incorporated at some convenient point in the transmission of the drive to the working members so that, when required, their directions of rotation can be opposite to the directions B indicated in FIG. 1 of the drawings.

Figure 17:
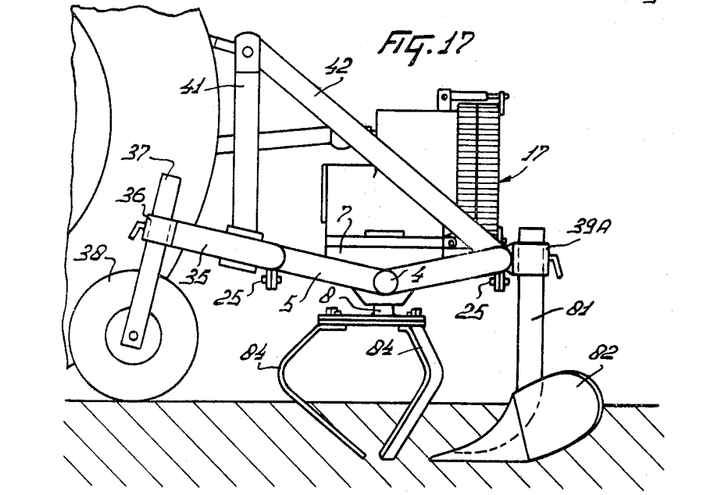
FIG. 17 is a side elevation corresponding to FIG. 2 but showing the provision of an alternative form of soil-working members and also the provision of ridging mechanism to the rear of the soil-working members.
Figure 18:
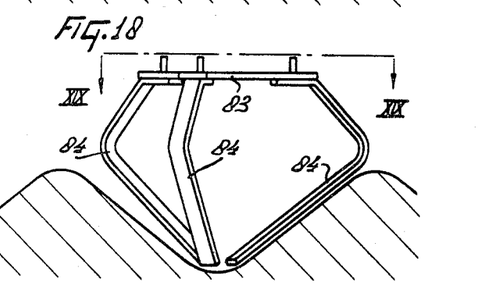
FIG. 18 is a side elevation illustrating the method of operation of the soil-working members of FIG. 17.
Figure 19:
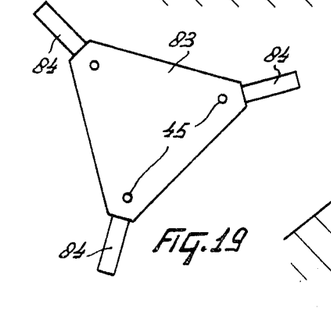
FIG. 19 is a view as seen in the direction indicated by the arrows XIX—XIX of FIG. 18.

FIG. 17 of the drawings shows the cultivating implement or cultivator of FIGS. 1 and 2 provided with ridging mechanism. The ridging mechanism takes the form of four ridging attachments 82 that are maintained in appropriate positions at the rear of the four working members by support strips 81 entered adjustably in the four rectangular sleeves 39A. The center of each ridging attachment 82 is located perpendicularly rearwardly, in the direction A, from the axis of rotation of the corresponding working member. FIGS. 18 and 19 of the drawings show one of these working members in greater detail. The working member includes a triangular support plate 83 provided with three strip-shaped tines 84 the upper ends of which are connected to the lower surface of the plate 83 at the three corners of the latter. It will be seen from the drawings that each tine 84 has a downwardly and outwardly projecting upper portion the lowermost end of which merges by way of a curve into a downwardly and inwardly projecting lower portion, the lowermost ends of the three lower portions being located quite close to one another and to the axis of rotation of the working member. In side elevation (FIG. 18), the working member has a shape somewhat reminiscent of a toy spinning top. The tines 84 are of resilient construction and it is preferred that they should be formed from spring steel strip.

When the cultivating implement is provided with working members and ridging attachments 82 as shown in FIG. 17 of the drawings, it can be used in the formation of substantially lump-free surface ridges of the kind that are conventionally employed in the cultivation of potatoes and some other crops. The cultivating implement may be used during the subsequent growth of such crops by moving the working members lengthwise of the grooves that are formed between the ridges (see FIG. 18) to maintain the shapes of the ridges and cut down weeds. The resiliency of the tines 84 allows them to deflect upwardly and downwardly to an appreciable extent during a cultivating operation.

Figure 20:
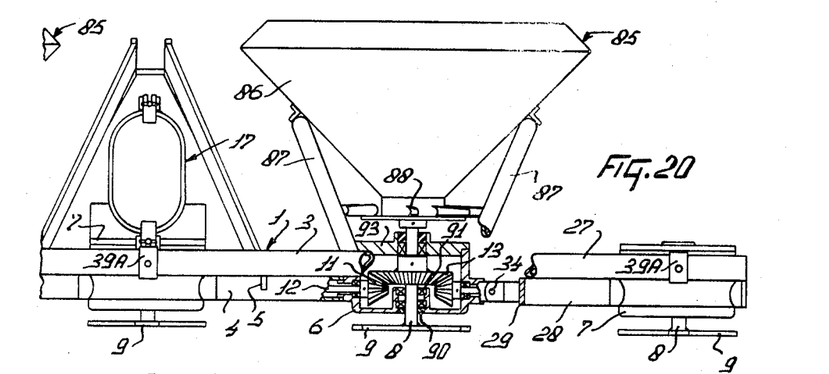
FIG. 20 is a rear view of part of the cultivating implement or cultivator of FIG. 1 provided with mechanism for spreading seeds and/or fertilizers.

FIG. 20 of the drawings shows a modification of the cultivating implement that has been described in which attachments 85 for the spreading of seeds, fertilizer and so on are connected to the frame 1 so as to lie alongside one another in a horizontal direction perpendicular to the direction A. Each attachment 85 includes a container in the form of an inverted conical hopper 86 that is supported from the frame beams 2 and 3 by beams 87. The lowermost end of the hopper 86 opens into a rotary bladed spreading member 88 that is connected to the upper end of an upward extension of a corresponding one of the rotary shafts 8. The shaft 8 projects through a removable cover or lid 93 above the bevel pinion 13, the lid 93 being provided with a vertical bearing and an oil seal. A sleeve 90 surrounds the shaft 8 beneath the bevel pinion 13 and is provided with a vertical bearing 91 and an oil seal. The gear box 6 may be filled with lubricating oil to the level of the common longitudinal axis of the shafts 12 and the oil seals will act to prevent leakage of this oil from the gear box.

In the use of the modified cultivating implement illustrated in FIG. 20 of the drawings, the feeding of seeds and/or fertilizers from the hoppers 86 to the spreading members 88 may be accomplished in a manner which it is not necessary to describe in detail in the present specification. The implement will thus till the soil and simultaneously broadcast seeds and/or fertilizer. The illustrated implement has two attachments 85 and one of them may be used for the spreading of seeds while the other is used for the spreading of a powdered or granular fertilizer.

What is claimed is:

1. A soil cultivating implement having a frame movable over the ground during cultivating operation and a plurality of rotatable supports for soil-working members with driving means for rotating each of said supports, each of said rotatable supports comprising a generally vertical shaft and a substantially horizontal member secured to the lower part of said shaft to which a plurality of different types of soil-working members with downwardly extending tines are detachably connectable, said rotatable supports being driven through a transmission which comprises a change-speed gear whereby different speeds of rotation of said supports can be obtained in response to a single input speed of rotation, an adjusting mechanism attached to one side of said frame to vary the working heights of the various soil-working members, said adjusting mechanism including rotatable ground engaging means connected to the forward part of said frame to support said implement, the forward part of said frame having a hitching member above said ground engaging means for connection to a three-point lifting device of a prime mover, whereby the effective soil-working heights of said soil-working members can be controlled by said adjusting mechanism and said lifting device.

2. An implement as claimed in claim 1, wherein there are a plurality of rotatable support means mounted side-by-side relative to the direction of travel and substantially directly below said frame.

3. An implement as claimed in claim 1, wherein said adjusting device comprises at least one wheel on a leg which is adjustably attached to the forward part of said frame to adjust the working heights of said soil-working members.

4. An implement as claimed in claim 1, wherein said change-speed gear includes two pairs of cooperating tooth pinions, each of said pairs being operative between the driving and the driven shafts of said transmission.

5. An implement as claimed in claim 1, wherein a plurality of soil-working members are mounted adjacent one another on said frame, with one of said soil-working members being vertically movable relative to the other soil-working members which are relatively immovable, said one movable soil-working member being angularly displaceable about an axis that extends substantially parallel to the direction of travel.

* * * * *